Figure 1:
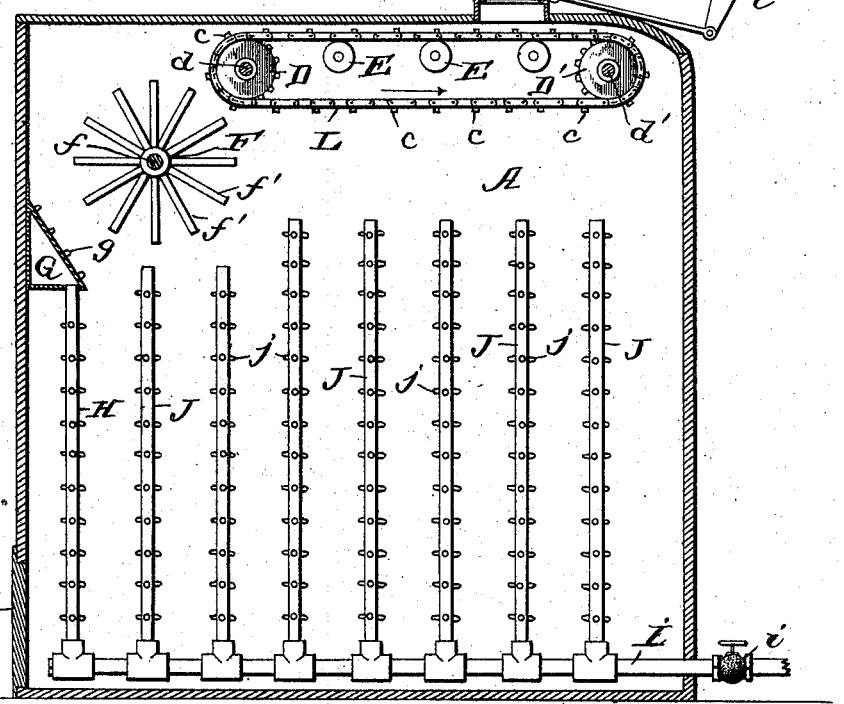

(No Model.)  2 Sheets—Sheet 1.

M. PRIDHAM.
APPARATUS FOR DECOLORIZING SUGAR.

No. 574,000.  Patented Dec. 29, 1896.

Witnesses:  Inventor:
J. B. McGirr.  Marshall Pridham,
J. P. Appleman.  by Hinson & Hinson,
 his Attys.

(No Model.) 2 Sheets—Sheet 2.
M. PRIDHAM.
APPARATUS FOR DECOLORIZING SUGAR.
No. 574,000. Patented Dec. 29, 1896.
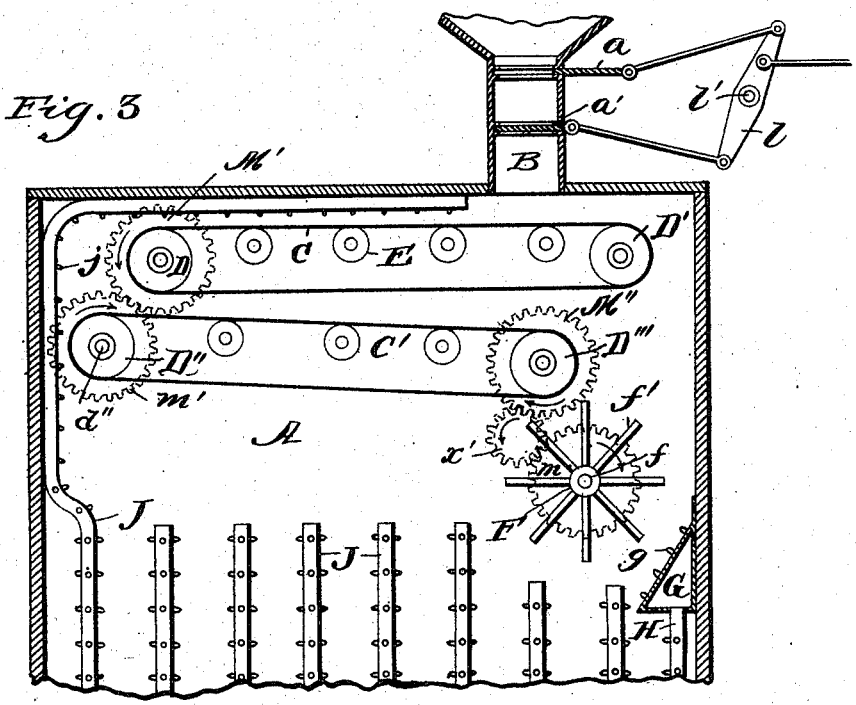
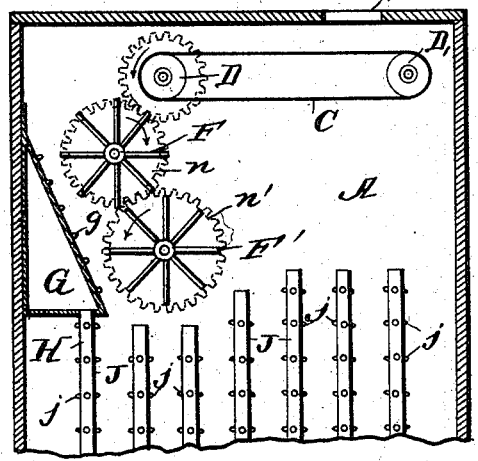
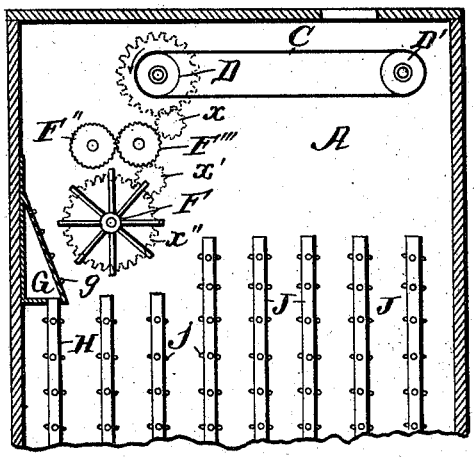
Witnesses:
Inventor:
Marshall Pridham,
by Howson & Howson,
his Attys.

UNITED STATES PATENT OFFICE.

MARSHALL PRIDHAM, OF PHILADELPHIA, PENNSYLVANIA, ASSIGNOR, BY DIRECT AND MESNE ASSIGNMENTS, TO THE ELECTRIC RECTIFYING AND REFINING COMPANY, OF CAMDEN, NEW JERSEY.

APPARATUS FOR DECOLORIZING SUGAR.

SPECIFICATION forming part of Letters Patent No. 574,000, dated December 29, 1896.

Application filed September 10, 1896. Serial No. 605,442. (No model.)

*To all whom it may concern:*

Be it known that I, MARSHALL PRIDHAM, a citizen of the United States, and a resident of Philadelphia, county of Philadelphia, State of Pennsylvania, have invented certain new and useful Improvements in Apparatus for Decolorizing Solid Saccharine Matter, &c., of which the following is a specification.

My invention relates to apparatus for treating raw or solid sugars, other solid saccharine matters, or other matters for the purpose of decolorizing and purifying the same.

In the present mode of decolorizing and purifying solid raw sugars it is the practice to first reduce the solid matter to a liquid condition, in which state it is subjected to one or more of the cumbersome, wasteful, and expensive processes of filtration well known to the sugar refiner, and it is my object to dispense entirely with these extravagant, complex, and lengthy processes by substituting therefor a simple means whereby solid sugars and other solid matters may be satisfactorily decolorized and purified while in the solid state, and I accomplish this object by subjecting the solid matter to the action of ozone gas in a suitable chamber or vessel, in order to cause a thorough contact of said gas with the particles of said sugar, &c.

In carrying out my process I preferably introduce the sugar or the other matter, in a more or less broken state, into a chamber or vessel of suitable size and shape, into which the said material falls upon a conveyer of suitable construction. By this conveyer the material is carried from the feeding end of the chamber toward the other end, and there drops upon a beater-roll or other form of disintegrating mechanism. As the material falls from the conveyer upon the beater-roll or disintegrator it is caught by the projecting blades or arms thereof, gently broken, and distributed in finer particles as it is discharged from said roll into the chamber. While falling through the chamber, in sheets or streams of particles, it is exposed to the action of ozone gas, preferably of a very high degree of strength, and the result is a speedy decolorization and purification of the mass.

I have shown in the accompanying drawings a preferable form of apparatus for carrying out my process, and referring to these drawings—

Figure 2:
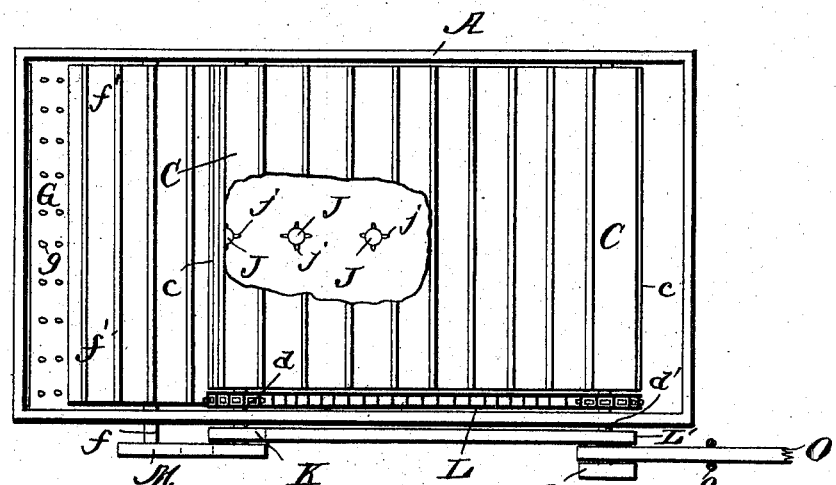

Figure 1 is a central longitudinal sectional view. Fig. 2 is a top plan view with top removed. Figs. 3, 4, and 5 are vertical sectional views of modified forms of apparatus embodying my invention.

In the drawings, where the same reference-characters relate to the same or corresponding parts in all the views, the letter A indicates a closed vessel or chamber, preferably rectangular in shape, which is provided near one end with a feed-hopper B, through which the material to be treated is fed into the chamber. This hopper is preferably provided with two cut-off valves $a$ and $a'$, operated by a lever $l$, fulcrumed at $l'$, so that when one valve is opened the other is closed, thereby keeping the treating-chamber closed at all times.

Any other suitable feeding device may be used in place of the one described, which is adopted merely because of its simplicity.

An endless horizontal belt conveyer C travels longitudinally of the chamber immediately below the feed-hopper throat or opening, two drums D and D', around which the conveyer-belt passes, being mounted upon shafts $d\ d'$, extending transversely of the chamber and journaled in the side walls thereof. A sprocket-chain L may also be used to secure a more positive driving of the drum D', if desired, the links of said chain engaging sprocket-teeth mounted on the drums D D' on their shafts.

In order to support the upper run of the belt when the weight of the material tends to bear it down, I preferably provide a suitable number of bearing-rollers E, journaled in the side walls of the chamber, and to insure the carrying of the material forward in the direction of the arrow I provide the conveyer-belt C with a series of strips or bars $c$, of metal or wood, as shown, having their upper edges extending upward to such a distance as to cause them to pass slightly below the throat of the feed-hopper B as the belt passes forward under said hopper. As the solid sugars or other matter falls from the hopper onto the belt it is caught by the strips c, and by the movement of the belt and the slight natural vibration thereof it is spread out upon the belt more or less evenly.

Located diagonally below the drum D is a beater or disintegrator roll F, provided with beater arms or bars $f'$, journaled in suitable bearings in the side walls of the chamber. These arms are arranged to rotate in close proximity to the delivery end of the conveyer and break the lumps into small particles, which are carried around and thrown downward, falling to the bottom of the chamber, scattering as they fall.

The shafts $d$, $d'$, and $f$ are provided on the outer ends with suitable gearing for communicating proper motion to the drums D and D' and the roll F, and I have shown in the drawings suitable pulleys K, L', and M, mounted, respectively, on the shafts $d$, $d'$, and $f$, driven by belts, and upon the shaft $d'$ is preferably placed a loose pulley N, to which the driving-belt O may be shifted by a convenient belt-shifter $o$ when it is desired to stop the operation for any reason.

As the particles of matter fall from the conveyer and the beater-roll they are exposed to the action of ozone gas which is discharged in jets from the nozzles or perforations $g$, supplied from the reservoir G on the side of the chamber and connected by pipe H to an ozone-supply pipe I, provided with a valve $i$ and leading from a suitable reservoir or supply of ozone gas. Extending upwardly from said supply-pipe I is a series of vertical pipes J, either perforated or provided with nozzles $j$, for supplying ozone to the chamber in sufficient quantities to treat the matter thoroughly.

From the foregoing description it will be seen that with the conveyer moving in the direction of the arrow and the material fed downward from the feed-hopper the said material is carried from the hopper over the drum D and discharged downwardly upon the beater-roll F, which breaks it into finer particles and throws it into the chamber, the material scattering as it falls. The jets of ozone issuing from the reservoir G strike the particles as they fall, and the jets issuing from the vertical pipes J likewise diffuse the ozone gas through and around the mass of particles, which are thus subjected to a thorough oxidizing action of the ozone, with the result that the solid matter is decolorized in the shortest possible time. After a sufficient quantity has been thus treated the feeding may be stopped and the decolorized mass removed from the chamber through a suitable outlet, as P, and the operation repeated on a new supply of material.

Many modifications in the disposition and construction of the feeding apparatus and ozone-distributing pipes may be made, and in Figs. 3, 4, and 5 I have shown three such modifications as examples, which may now be briefly described.

Referring first to Fig. 3, the chamber A may be provided with two or more sets of conveyers C and C', the former delivering its material to the latter and the nozzles being arranged to discharge the ozone gas upon the material on the conveyer C, and also upon the material falling from the conveyer C to the conveyer C'. The beater-roll F in this case is arranged at the other end of the chamber, but below the delivery end of the conveyer C', with the reservoir G located at the same end, with its nozzles $g$ discharging ozone against the falling particles. In this case the roll F and the drums D'' and D''' of the conveyer C are geared to rotate in unison with the drums D and D' by suitable gears M' and M'', meshing with gear $m'$ on the shaft $d''$, and the idler $x'$, meshing with gear $m$ on shaft $f$, which may be driven as before or in any other convenient manner.

In Fig. 4 there are shown two beaters or rolls rotated by suitable intermeshing gears $n$ and $n'$, one located in line with the other, so that the roll F' may receive a portion of the material as it is thrown out from the roll F, thus further breaking the lumps when it is desired to further disintegrate, or, if desired, two crushing-rolls F'' and F''' may be located under the delivery end of the conveyer C, rotated by suitable intermeshing gears $x$ $x'$ $x''$ and discharging the broken lumps to a beater-roll below the same, the other parts remaining the same in construction, as shown in Fig. 3.

With these suggestions it will be evident that my invention is susceptible of various changes without departing from the broad principles thereof, and I therefore wish it understood that I do not limit myself to the details of construction shown in the drawings, nor do I limit myself to the treatment of saccharine matters, as my process may be applied to decolorization of solid resinous substances as well.

I claim as my invention—

1. As an improvement in apparatus for decolorizing solid sugars and other matters, the combination with a suitable vessel and a feeding-hopper for feeding the matter to said vessel, of a conveyer located in said vessel below the hopper for conveying the material horizontally through the vessel, a beater-roll located below the delivery end of the conveyer upon which the material falls and is broken into particles, and means for directing ozone gas against the particles as they fall from below the beater-roll, substantially as described.

2. As an improvement in apparatus for decolorizing solid sugars and other matters, the combination with a vessel, of a feed-hopper for feeding the material to the vessel, a horizontal conveyer in said vessel traveling below said hopper, a beater-roll for breaking the material into fine particles as it falls from the conveyer, a reservoir for ozone gas provided with nozzles for directing jets of ozone gas against said particles, and a pipe connecting said reservoir with an ozone-supply, substantially as described.

3. As an improvement in apparatus for decolorizing sugars and other matters, the combination with a vessel having a feed-hopper through which material is fed to the vessel, of a conveyer mechanism located under the hopper-discharge in the vessel, a beater-roll for breaking the material into fine particles as it falls from the conveyer, an ozone-supply pipe leading into the bottom of the chamber, a series of vertical perforated pipes, communicating with said supply-pipe, and a reservoir connected with said supply-pipe provided with nozzles or perforations for directing ozone jets against the particles of material as it falls down in the vessel, substantially as described.

4. As an improvement in apparatus for decolorizing sugars and other matters, the combination with a vessel, of means for feeding solid sugars or other matters thereto a conveyer for receiving said material and carrying it through the vessel, means for breaking the material into fine particles as it falls from the conveyer, and means for directing ozone gas against the particles as they fall through said vessel, substantially as described.

In testimony whereof I have signed my name to this specification in the presence of two subscribing witnesses.

MARSHALL PRIDHAM.

Witnesses:
S. A. TERRY,
M. H. MILES.